United States Patent
Kamo et al.

(10) Patent No.: US 7,044,307 B2
(45) Date of Patent: May 16, 2006

(54) DRUM TYPE PAPER STOCK FINE SCREEN

(75) Inventors: Eiichi Kamo, Shizuoka-ken (JP); Nobuyuki Kamo, Shizuoka-ken (JP)

(73) Assignee: Sakae Kohki Co., Ltd., Shizuoka-ken (JP)

( * ) Notice: Subject to any disclaimer, the term of this patent is extended or adjusted under 35 U.S.C. 154(b) by 216 days.

(21) Appl. No.: 10/462,730

(22) Filed: Jun. 17, 2003

(65) Prior Publication Data

US 2004/0195167 A1 Oct. 7, 2004

(30) Foreign Application Priority Data

Apr. 1, 2003 (JP) .............................. 2003-098348

(51) Int. Cl.
*B01D 33/073* (2006.01)
*B01D 33/44* (2006.01)
*D21D 5/06* (2006.01)

(52) U.S. Cl. ...................... 210/391; 210/394; 210/403; 210/784; 210/791; 162/60; 162/276

(58) Field of Classification Search ................ 210/359, 210/391, 393, 394, 402, 403, 407, 780, 784, 210/791, 797, 798; 162/60, 272, 275, 276
See application file for complete search history.

(56) References Cited

U.S. PATENT DOCUMENTS

| | | | | |
|---|---|---|---|---|
| 292,947 A | * | 2/1884 | Porter et al. ................. | 210/403 |
| 889,159 A | * | 5/1908 | Trump ......................... | 422/270 |
| 2,064,024 A | * | 12/1936 | Mcintyre et al. ........... | 210/403 |
| 4,140,629 A | * | 2/1979 | Martindale .................. | 209/240 |
| 4,439,320 A | * | 3/1984 | Blok ........................... | 210/394 |
| 4,485,646 A | * | 12/1984 | Henricson .................... | 68/18 F |
| 4,507,202 A | * | 3/1985 | Nord et al. .................. | 210/391 |
| 5,266,168 A | * | 11/1993 | Suica .......................... | 162/314 |
| 5,607,587 A | * | 3/1997 | Langner .................. | 210/380.3 |
| 6,261,417 B1 | * | 7/2001 | Iwashige ..................... | 162/261 |
| 6,868,973 B1 | * | 3/2005 | Kamo et al. ................. | 210/403 |

FOREIGN PATENT DOCUMENTS

| | | | |
|---|---|---|---|
| DE | 3114376 | * | 10/1982 |
| DE | 3403383 | * | 8/1985 |
| JP | 3231748 | | 9/2001 |

* cited by examiner

*Primary Examiner*—Fred G. Prince
(74) *Attorney, Agent, or Firm*—Wenderoth, Lind & Ponack, L.L.P.

(57) ABSTRACT

A drum type paper stock refine screen is provided which is capable of efficiently filtering a refined paper stock to the outside of a laterally suspended rotary drum and efficiently discharging foreign matter to the outside of the drum while rotating the drum. The drum type paper stock refine screen includes a lower water infiltration zone formed by infiltrating a lower circular part on one end side of a laterally suspended rotary drum in a water tank, a non-water infiltration zone continuous with the lower water infiltration zone on the other end side of the rotary drum, and a paper stock injection port for injecting a paper stock in the lower water infiltration zone. A refined paper stock of the injected paper stock is passed into the water tank through air and water passage apertures formed in a wall which forms the rotary drum, and in the lower water infiltration zone, foreign matter, which has not passed through the air and water passage apertures in the lower water infiltration zone, is discharged into the non-water infiltration zone.

4 Claims, 5 Drawing Sheets

DRUM TYPE PAPER STOCK FINE SCREEN

BACKGROUND OF THE INVENTION

1. Field of the Invention

This invention relates to a drum type paper stock refine screen which is used for removing foreign matter from a paper stock which serves as a paper-making material.

2. Related Art

A paper stock serving as a paper-making material, particularly a paper stock composed of a waste paper pulp which is macerated by a pulper is mixed therein with foreign matter such as, for example, resin chips caused by a binding string, tar particles, metal foreign matter such as metal binding devices, and the like.

Heretofore, it has been known to use a cyclone device, a vibrating device, a centrifugal separating device or the like as a device for obtaining a refined paper stock by removing foreign matter from the paper stock.

On the other hand, patent material 1, which is the Official Gazette of Japanese Patent No. 3231748 and which is owned by the present applicant, provides a paper stock washing device in which a paper stock is put into a lateral rotary drum, wherein the paper stock is then repeatedly raked up by a raking fin which is disposed at the inner peripheral surface of the rotary drum and allowed to drop in accordance with rotation of the rotary drum, and wherein ink component in the paper stock is filtrated and dewatered through air and water passage apertures which are formed in the drum peripheral wall.

SUMMARY OF THE INVENTION

It is an object of the present invention to provide a drum type paper stock refine screen which employs the rotary drum type system shown in the patent material 1 instead of employing the principles based on which the conventional cyclone device, vibrating device, centrifugal separating device and the like are formed, and in which foreign matter in the paper stock is properly removed by the rotary drum so that a refined paper stock can be obtained.

From one aspect of the present invention, there is provided a drum type paper stock refine screen including a lower water infiltration zone formed by infiltrating a lower circular part of a laterally suspended rotary drum in a water tank and a paper stock injection port for injecting a paper stock in the lower water infiltration zone, a refined paper stock of the injected paper stock being passed into the water tank through air and water passage apertures formed in a wall which forms the rotary drum, wherein in the lower water infiltration zone, foreign matter, which has not passed through the air and water passage apertures in the lower water infiltration zone, is discharged from one end of the lower water infiltration zone.

From another aspect of the present invention, there is also provided a drum type paper stock refine screen including a lower water infiltration zone formed by infiltrating a lower circular part on one end side of a laterally suspended rotary drum in a water tank, a non-water infiltration zone continuous with the lower water infiltration zone on the other end side of the rotary drum, and a paper stock injection port for injecting a paper stock in the lower water infiltration zone, a refined paper stock of the injected paper stock is passed into the water tank through air and water passage apertures formed in a wall which forms the rotary drum, wherein, in the lower water infiltration zone, foreign matter, which has not passed through the air and water passage apertures in the lower water infiltration zone, is discharged into the nonwater infiltration zone.

It is preferred that the rotary drum part which forms the lower water infiltration zone is provided with an inclination drum part which is gradually reduced in diameter towards the foreign matter discharging side, and the foreign matter is guided by a lower upward inclination surface of the inclination drum part so as to be discharged.

It is also preferred that the wall forming the rotary drum is provided at an inner side thereof with a raking fin for raking up the foreign matter from the inside of the lower water infiltration zone so as to be discharged.

Preferably, the rotary drum is provided at an inner or outer side thereof with a shower for flowing down the paper stock into the lower water infiltration zone from the wall forming the rotary drum, wherein the paper stock, which has been flowed down into the lower water infiltration zone, is passed into the water tank through the air and water passage apertures formed in the wall forming the rotary drum.

DETAILED DESCRIPTION OF THE INVENTION

Figure 1:
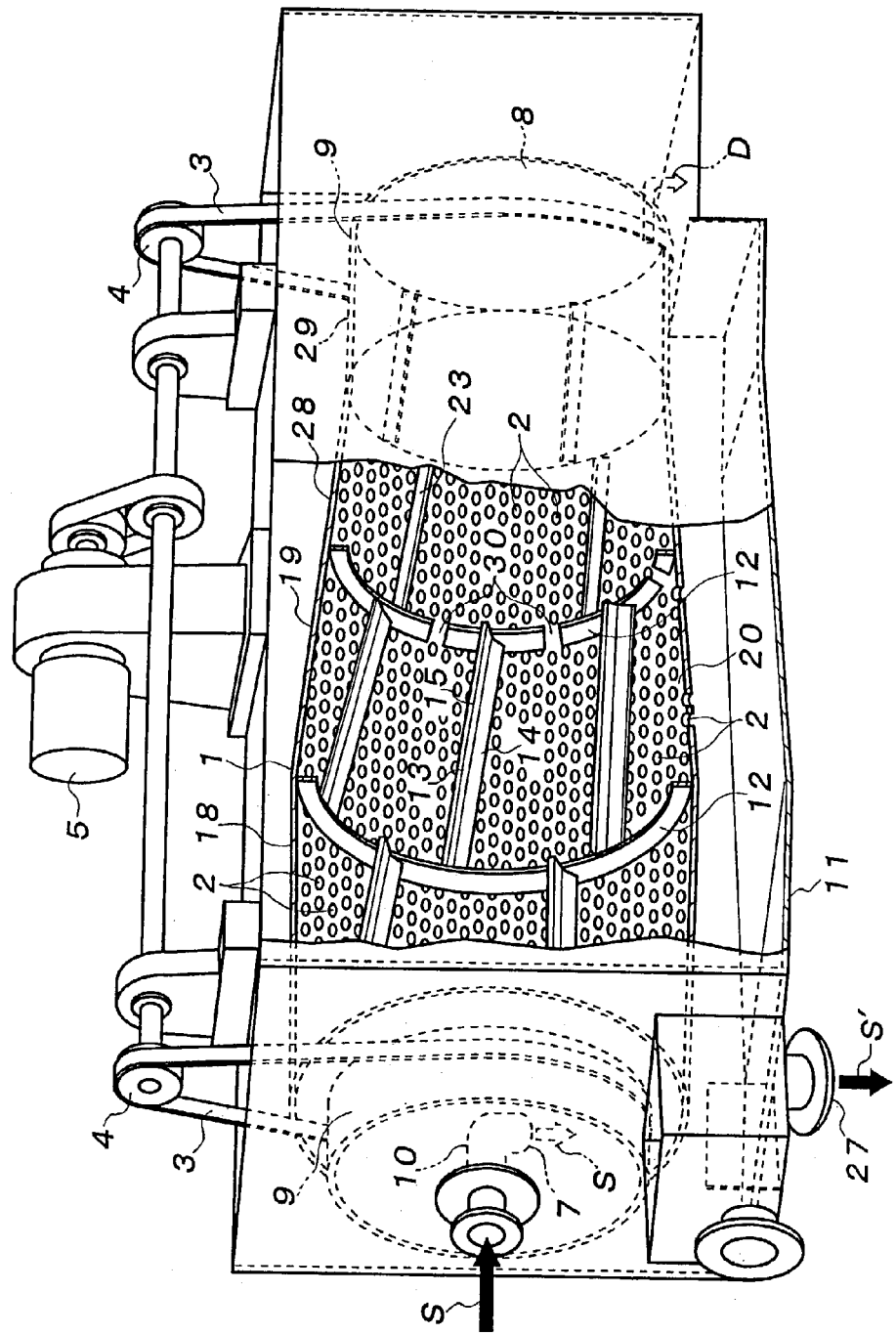
FIG. 1 is a perspective view showing, partly cutaway, a drum type paper stock refine screen according to the present invention.
Figure 2:
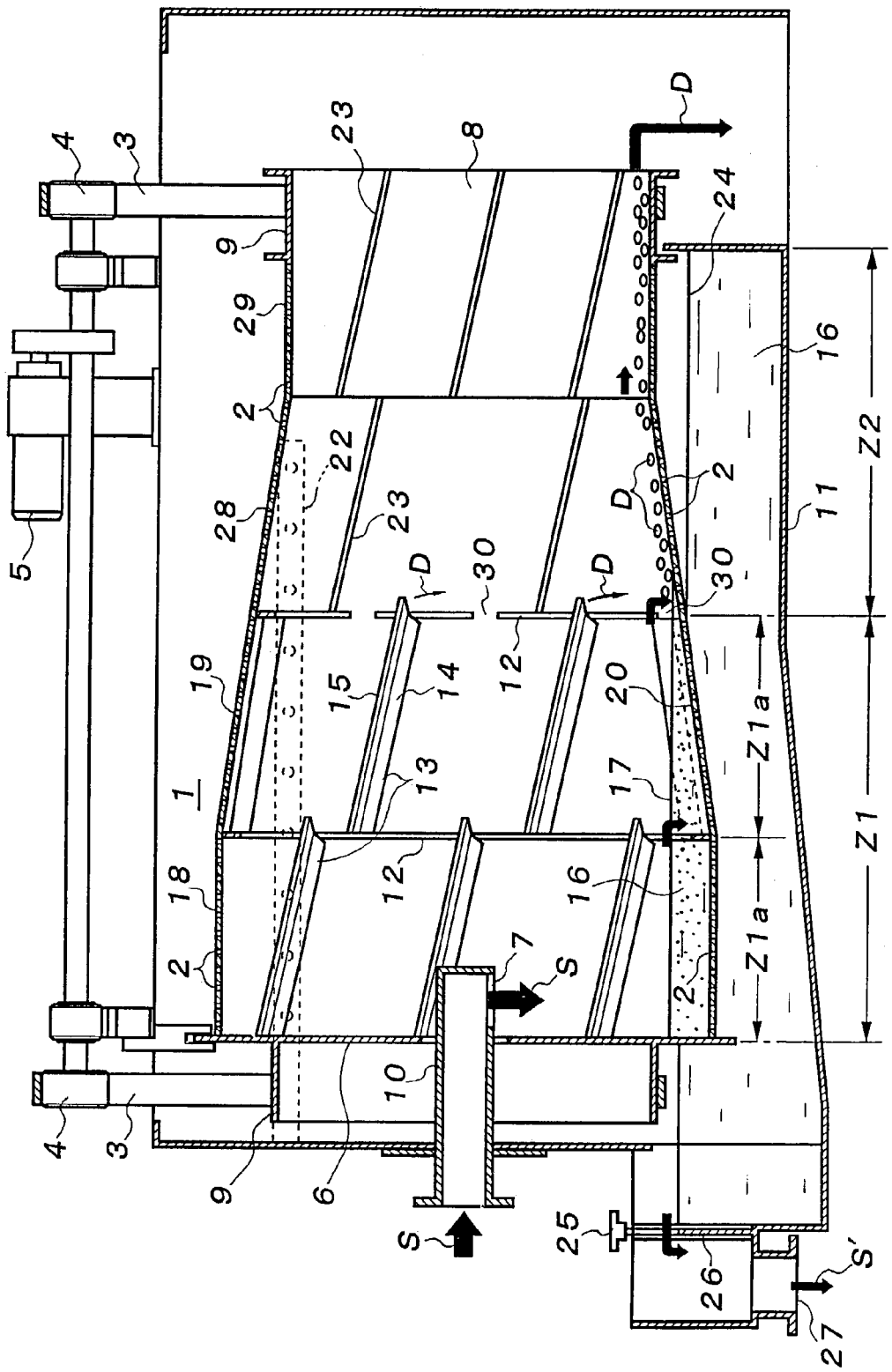
FIG. 2 is a vertical sectional view showing the above drum type paper stock refine screen.
Figure 3:
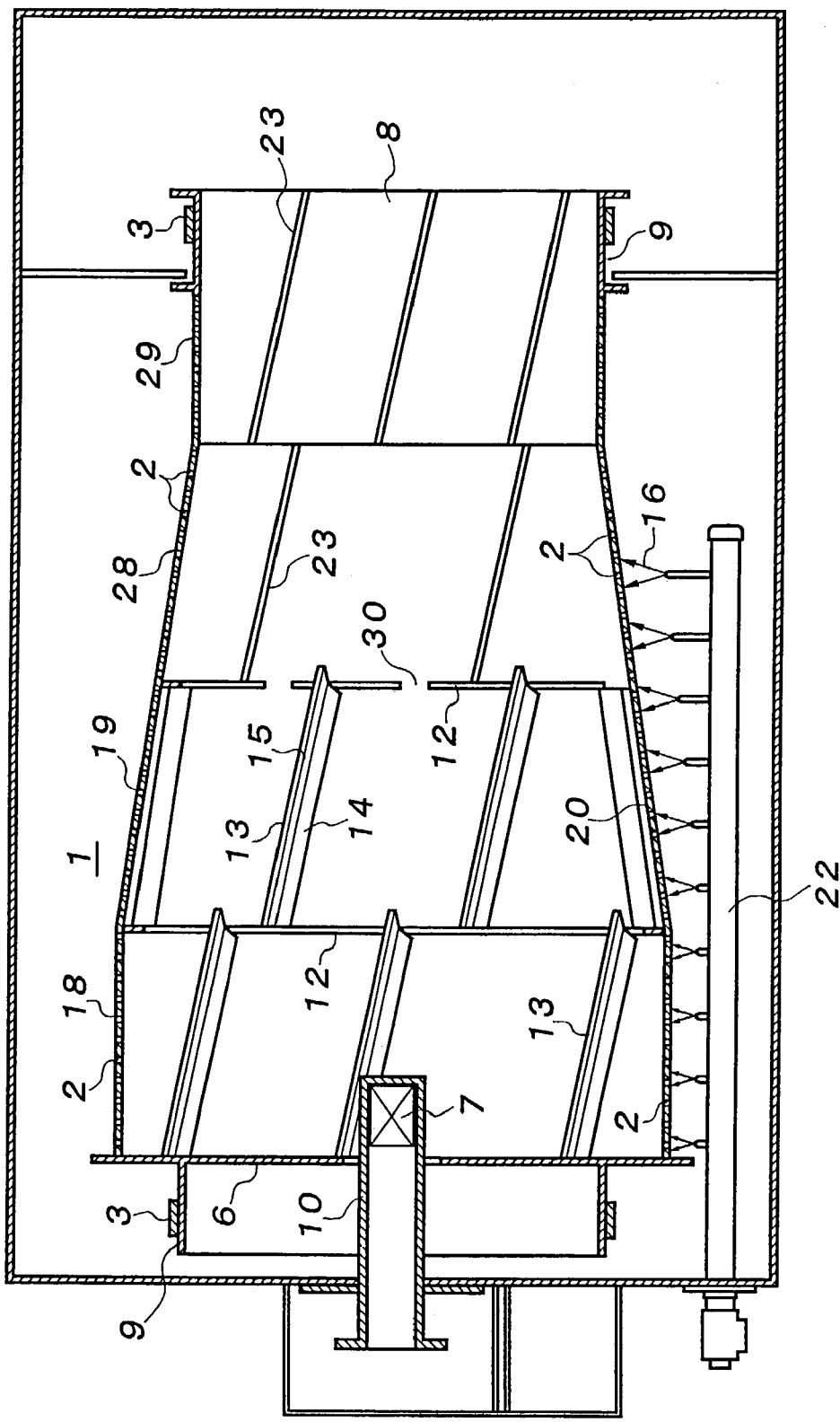
FIG. 3 is a lateral sectional view of the above drum type paper stock refine screen.
Figure 4:
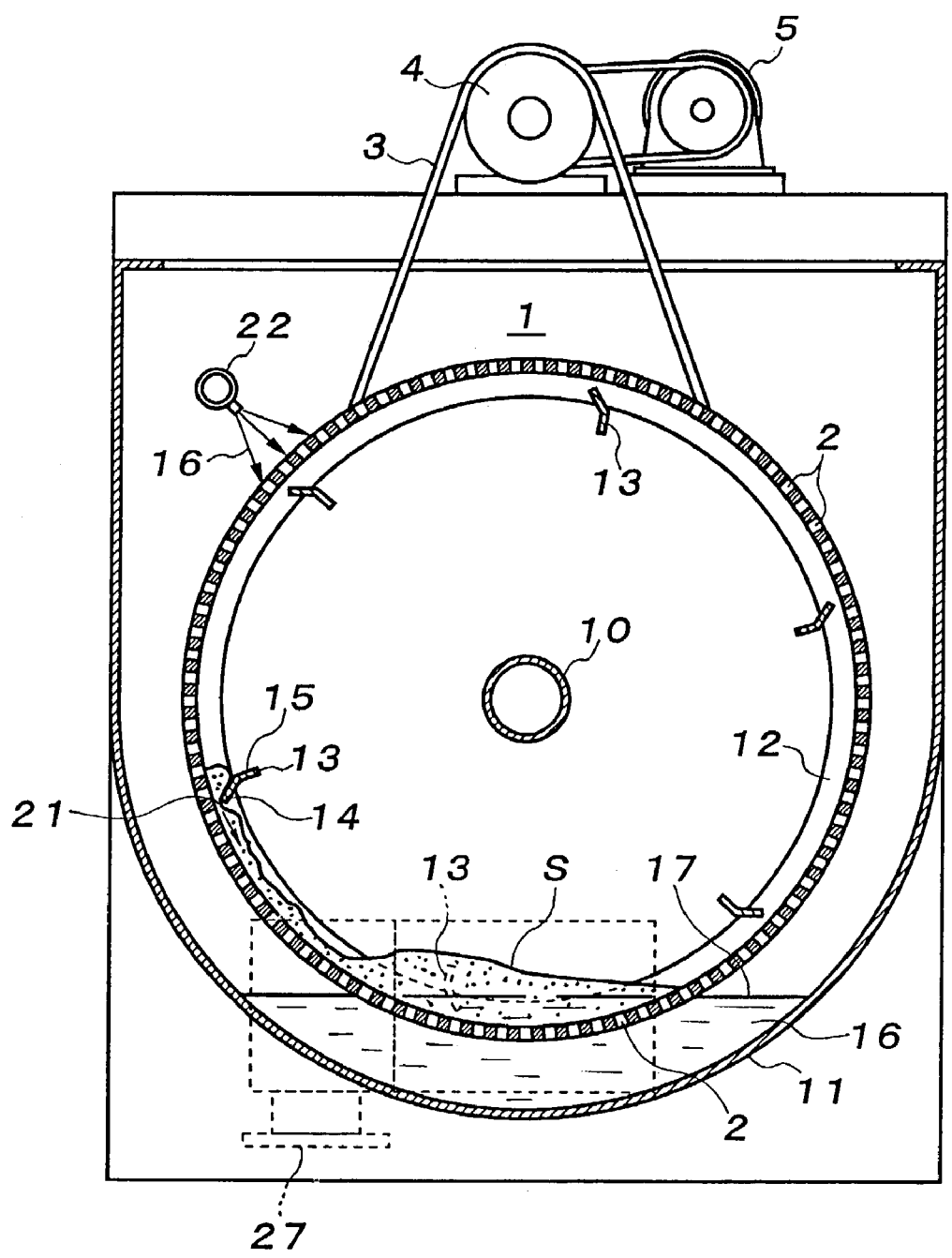
FIG. 4 is a cross-sectional view of the above drum type paper stock refine screen.
Figure 5:
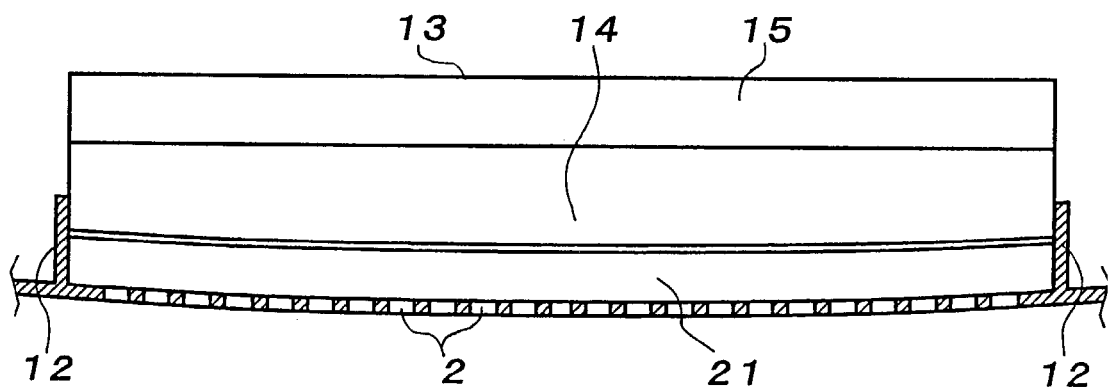
FIG. 5 is a vertical sectional view showing an essential part of the drum showing a raking fin in the above drum type paper stock screen.
Figure 6:
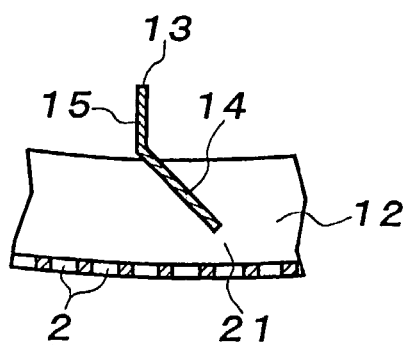
FIG. 6 is a cross-sectional view of the above raking fin.

One preferred embodiment of the present invention will now be described hereinafter with reference to FIGS. 1 through 6.

Reference numeral 1 denotes a rotary drum having an air and water passing structure which includes a plurality of air and water passage apertures 2 formed in a drum formation wall. A belt hanging cylindrical portion 9 is coaxially connected to each end of the rotary drum 1. A drum hanging drive belt 3 is disposed around the outer peripheral surface of the belt hanging cylindrical portion 9. The upper end of the drum hanging drive belt 3 is suspendingly laterally supported on a drive wheel 4 such that the rotary drum 1 is driven for rotation.

The rotary drum 1 is driven for rotation by a motor 5 such that the rotary drum 1 is rotated in the lateral direction.

As means for making the rotary drum 1 into an air and water passage structure, a porous metal plate having the air and water passage apertures 2 composed of a plurality of round holes or grooves is bent into a cylindrical configuration to form the rotary drum 1. It is also an interesting alternative that a circular weir plate 12 as later described is used as a support rib and a metal mesh is laid on this support rib in a cylindrical shape to thereby form the drum 1.

The rotary drum 1 having the air and water passage structure is provided at the center of an end plate 6 covering an open face of one end thereof with a paper stock injection pipe 10 extending into the drum 1 from the outside of the drum 1 and a forward end of the paper stock injection pipe 10 with a paper stock injection port 7 which opens downward. The other end face of the drum 1 is left open to serve as a foreign matter discharge port 8.

A lower circular part of the rotary drum 1 is infiltrated to under the surface of the water in the water tank 11 to form a lower water infiltration zone Z1, and a wet paper stock S having a comparatively high concentration is injected into the lower water infiltration zone Z1 through the paper stock injection port 7.

The water tank 11 is provided at a lower part of the rotary drum 1. A washing water 16 in the water tank 11 is entered into the drum 1 through the air and water passage apertures 2 formed in the wall forming the drum 1 at the lower circular part of the drum 1, so that a water surface 17 is formed in the lower circular part of the drum 1. The level of the water surface 17 is preferably in a range of from 30 degrees to 90 degrees in angle of rotation of the drum 1. At any rate, the water surface 17 in the water infiltration zone Z1 is set to a lower part of the paper stock injection port 7.

The paper stock S injected through the paper stock injection port 7 is dropped into the washing water 16, and a refined paper stock S' passing through the air and water passage apertures 2 at the lower circular part of the drum 1 is discharged into the washing water 16 in the water tank 11 which is located at the outside of the drum 1.

Foreign matter D, which has not passed through the air and water passage apertures 2, in the lower water infiltration zone Z1, is discharged to the outside of the drum 1 from a tail end of the lower water infiltration zone Z1.

An example which is formed on a basis of the above-mentioned description will now be described. The lower water infiltration zone Z1 is formed by a drum part on the paper stock injection port side of the laterally suspended rotary drum 1. That is, the lower circular part on one end side of the rotary drum 1 is infiltrated in the water tank 11 to form the lower water infiltration zone Z1, and a non-water infiltration zone Z2 is formed by the rotary drum part, i.e., the other end side of the rotary drum 1, which is connected with the lower water infiltration zone Z1. The refined paper stock of the injected paper stock is passed through the washing water 16 in the water tank 11 through the air and water passage apertures 2 formed in the wall which forms the lower water infiltration zone Z1, and the foreign matter D, which has not passed through the air and water passage apertures 2, in the lower water infiltration zone Z1, is discharged to the non-water infiltration zone Z2 so as to be discharged to the outside through the foreign matter discharge port 8.

The lower water infiltration zone Z1 includes a perfectly cylindrical drum part 18 arranged on the paper stock injection side and an inclination drum part 19 arranged on the foreign matter discharge port 8 side which is continuous with the drum part 18.

The inclination drum part 19 is gradually reduced in diameter towards the foreign matter discharge side, and the foreign matter D is guided by a lower upward inclination surface 20 of the inclination drum part 19 so as to be discharged to a lower inner surface of the rotary drum part which forms the non-water infiltration zone Z2.

The water surface 17 of the washing water 16 in the water tank 11 reaches the tail end of the inclination drum part 19, i.e., the upper end of the lower upward inclination surface 20.

The upper end of the lower upward inclination surface 20, which is the tail end of the inclination drum part 19, is provided with a weir plate 12. In other words, the tail end of the lower water infiltration zone Z1 is provided with the weir plate 12. The water surface 17 of the washing water 16 is formed between the end plate 6 and the weir plate 12, thereby forming the lower water infiltration zone Z1. The water surface 17 of the washing water 16 at the bottom part in the drum 1 is generally equal in level to the weir plate 12 at the tail end of the zone Z1.

The weir plate 12 is allowed to extend annularly along the inner peripheral surface of the rotary drum 1. A plurality of such annular weir plates 12 may be axially spacedly arranged so that the lower water infiltration zone Z1 is partitioned into plural zones by the weir plates 12. The weir plates 12 are integrally attached, for example, to the inner peripheral surface of the drum 1 by welding so that plural washing zones Z1a partitioned in the lower water infiltration zone Z1 along the inner peripheral surface of the drum 1 by the weir plates 12 are axially arranged in side-by-side relation. The last washing zone Z1a is formed on the inclination drum part 19.

The wall forming the rotary drum 1 which forms the lower water infiltration zone Z1 is provided at an inner side thereof with a raking fin 13 for discharging the foreign matter D into the non-water infiltration zone Z2 by allowing the foreign matter D to climb over the last weir plate 12.

The last weir plate 12 may be provided with a plurality of cutout parts 30 which are spacedly arranged in the peripheral direction of the last weir plate 12 and which are adapted to allow the passage of the foreign matter therethrough. The foreign matter is discharged in to the non-water infiltration zone Z2 from the tail end of the lower upward inclination surface 20 through the cutout parts 30.

The raking fins 13 are arranged between the end plate 6 and the respective weir plates 12 and between the adjacent weir plates 12. Each raking fin 13 is laterally installed in such a manner as to extend in the direction crossing the weir plate 12. The raking fins 13 are spacedly arranged in the peripheral direction of the drum part which forms the lower water infiltration zone Z1.

Preferably, the raking fins 13 between the axially adjacent weir plates 12 are mutually displacingly arranged in the peripheral direction. In other words, the raking fins 13 are arranged in a zigzag manner.

Both ends of each raking fin 13 are connected to the adjacent weir plate 12 by welding or the like and oriented in the direction diagonally crossing the axis of the drum 1. That is, the raking fins 13 are oriented in such a manner as to be slanting downhill towards the foreign matter discharge side from the paper stock injection side.

The entire or part of each raking fin 13 is allowed to project from the inner edge of the weir plate 12. That is, a lower half part of each raking fin 13 is allowed to extend between the adjacent weir plates 12 and the upper half part is allowed to project inward between the adjacent weir plates 12.

The lower half part 14 of each raking fin 13 is set in such a manner as to possess a clearance angle to the rotational direction of the rotary drum 1, and the upper half part 15 is generally vertically erected towards the axis of the rotary drum 1.

Preferably, a paper stock passage interval 21 for allowing the passage of the paper stock S in the peripheral direction is formed between the end edge of the lower half part 14 of each raking fin 13 and the inner peripheral surface of the rotary drum 1 so that the paper stock S raked up by the raking fin 13 is allowed to flow back through the interval 21.

By orienting each raking fin 13 in such a manner as to be slanting downhill towards the foreign matter discharge port 8 side, the foreign matter D raked up by the raking fin 13 is discharged to the starting end of the non-water infiltration zone Z2.

The raking fin 13 disposed in the lower water infiltration zone Z1 rakes up the paper stock S from the water infiltration zone Z1 and allows the paper stock S to climb over the upper half part 15 of the raking fin 13 during its rotating process so as to be dropped into the washing water 16 in the lower water infiltration zone Z1. The raking fin 13 also encourages the paper stock S, which has been raked up, to flow back through the paper stock passage interval 21, so that the washing effect with respect to the paper stock S by the washing water 16 is enhanced.

The paper stock S injected in the washing water 16 which forms the lower water infiltration zone Z1 in the rotary drum 1 through the paper stock injection port 7, is restrained in flow by the weir plates 12, gradually climbs over the weir plates 12 partitioning the lower water infiltration zone Z1 while being retained in the respective paper stock washing zones Z1a and finally reaches the last washing zone Z1a from the first washing zone Z1a.

During this time, in the respective paper stock washing zones Z1a, the raking fins 13 rake up the paper stock S from the bottom part of the drum 1 in the peripheral direction so that the paper stock S is repeatedly dropped and flowed back.

While agitating and dispersing the paper stock S in the washing water 16 in the lower water infiltration zone Z1, the raking fin 13 discharges the refined paper stock S' into the water tank 11 through the air and water passage apertures 2 formed in the drum part which forms the lower water infiltration zone Z1.

The non-water infiltration zone Z2 is provided with means for propelling the foreign matter D towards the foreign matter discharge port 8. For example, the rotary drum part, which forms the non-water infiltration zone Z2, is provided at an inner surface thereof with a plurality of guide fins 23 which are downwardly inclined towards the foreign matter discharge port 8 and which are spacedly arranged in the peripheral direction.

It is also an interesting alternative that a guide fin composed of a spiral fin is disposed at the inner surface of the rotary drum part which forms the non-water infiltration zone Z2, so that the foreign matter D is enhanced to be discharged towards the foreign matter discharge port 8.

As another concrete example, the water tank 11, which forms the lower water infiltration zone Z1, is installed in such a manner as to reach a lower part of the rotary drum part which forms the non-water infiltration zone Z2, and the water surface 24 of the washing water 16 in the water tank 11 is set in such a manner as to be located at a lower part of the non-water infiltration zone Z2.

In the non-water infiltration zone Z2, a part of the paper stock S is guided out together with the foreign matter D, and this paper stock S is dropped into the water tank 11 through the air and water passage apertures 2 formed in the wall which forms the rotary drum part which forms the non-water filtration zone Z2 so as to be converged with the refined paper stock S' in the lower water filtration zone Z1.

By doing so, the refined paper stock S' is obtained in the water tank 11. The refined paper stock S' thus obtained is discharged from a paper stock outlet port 27 while allowing the refined paper stock S' to be spilt over a water surface adjusting gate 26 which can be adjusted in height by a handle 25 disposed at an end part of the water tank 11. The refined paper stock S' of good quality is supplied as a paper making material.

The drum part, which forms the non-water filtration zone Z2, is provided on the tail end side of the lower water infiltration zone Z1 with an inclination drum part 28 slanting uphill towards the foreign matter discharge port 8, and a perfectly circular cylindrical drum part 29 is connected to the end part on the foreign matter discharge port 8 side of the inclination drum part 28.

In case the inclination drum part 19 is provided in the lower water infiltration zone Z1, the inclination drum part 19 and the inclination drum part 28 in the non-water infiltration zone Z2 are connected to each other and they are reduced in diameter at an equal inclination angle.

That is, the inclination drum part 19 is formed on the enlarged-diameter side of the drum part which is reduced in diameter towards the foreign matter discharge port 8, and the inclination drum part 28 is formed on the reduced-diameter end side.

A shower pipe 22 for flowing down the paper stock S into the lower water infiltration zone Z1 from the wall which forms the rotary drum is disposed at the inner or outer side of the wall which forms the rotary drum, and the paper stock S, which has flowed down through the shower pipe 22, is passed into the water tank 11 through the air and water passage apertures 2 formed in the wall which forms the rotary drum.

The shower pipe 22 is allowed to extend along axis of the rotary drum in the vicinity of the upper dead points of the rotary drum parts 18, 19 which form the lower water infiltration zone Z1, and a washing water is jetted towards the drum formation wall from nozzles which are spacedly arranged in the longitudinal direction of the shower pipe 22 so that the paper stock S stuck to the inner surface of the drum formation wall flows downward.

That is, the paper stock S is stuck to the inner peripheral surfaces of the rotary drum parts 18, 19 escaped from the water surface 17 in the lower water infiltration zone Z1. This paper stock S flows down into the water tank 11 through the shower pipe 22, so that the filtering function of the drum formation wall in the lower water infiltration zone Z1 is maintained.

Likewise, the shower pipe 22 is allowed to extend along the axis of the rotary drum in the vicinity of the upper dead points of the rotary drum parts 28, 29 which form the non-water infiltration zone Z2, and a washing water is jetted towards nozzles which are spacedly arranged in the longitudinal direction of the shower pipe 22 so that the paper stock S stuck to the inner surface of the drum formation wall flows downward.

That is, the paper stock S is stuck to the inner peripheral surfaces of the rotary drum parts 18, 19 escaped from the water surface 17 in the non-water infiltration zone Z2. This paper stock S flows down into the water tank 11 through the shower pipe 22, so that the filtering function of the drum formation wall in the non-water infiltration zone Z2 can be maintained.

The shower pipes 22 are separately disposed in the lower water infiltration zone Z1 and in the non-water infiltration zone Z2, or the shower pipe 22 is continuously disposed from the lower water infiltration zone Z1 over to the non-water infiltration zone Z2. The shower pipe 22 is allowed to extend along the lower water infiltration zone Z1 such that at least the end part of the shower pipe 22 reaches the starting end part of the non-water infiltration zone Z2.

According to the present invention, there can be provided a drum type paper stock refine screen which can filter a refined paper stock to the outside of the drum and discharge foreign matter to the outside of the drum in an efficient manner.

What is claimed is:

1. A drum type paper stock refine screen comprising:
a lower water infiltration zone formed by infiltrating a lower circular part on a first end side of a laterally suspended rotary drum in a water tank containing washing water, said lower circular part of said first end of said rotary drum being disposed so as to be immersed in the washing water;
a non-water infiltration zone continuous with said lower water infiltration zone on a second end side of said rotary drum; and
a paper stock injection port for injecting a paper stock in said lower water infiltration zone,
wherein a refined paper stock of the injected paper stock is passed into the water tank through air and water passage apertures formed in a wall which forms said rotary drum,
wherein, in said lower water infiltration zone, foreign matter, which has not passed through said air and water passage apertures in said lower water infiltration zone, is discharged into said non-water infiltration zone,
wherein said first end side of said rotary drum is provided with an inclination drum part that is gradually reduced in diameter toward said second end side of said rotary drum,
wherein said inclination drum part is provided with a lower upward inclination surface that is arranged so as to guide the foreign matter toward said non-water infiltration zone,
wherein a plurality of annular weir plates are arranged at an inner surface of said rotary drum so as to be axially spaced from one another such that said lower water infiltration zone is partitioned into a plurality of zones by said weir plates,
wherein one of said annular weir plates is disposed at approximately an interface between said lower water infiltration zone and said non-water infiltration zone,
wherein a plurality of raking fins are arranged between adjacent ones of said annular weir plates so as to guide the foreign matter toward said non-water infiltration zone by allowing the foreign matter to pass over said weir plate disposed at approximately the interface between said lower water infiltration zone and said non-water infiltration zone, and
wherein a plurality of guide fins are arranged at an inner surface of said second end side of said rotary drum so as to guide the foreign matter toward a discharge port.

2. A drum type paper stock refine screen according to claim 1,
wherein said rotary drum is provided at an inner or outer side thereof with a shower for flowing down the paper stock into said lower water infiltration zone from said wall forming said rotary drum, and
wherein the paper stock, which has flowed down into said lower water infiltration zone, is passed into the water tank through said air and water passage apertures formed in said wall forming said rotary drum.

3. A method for obtaining refined paper stock, said method comprising:
disposing a lower circular part of a first end side of a laterally suspended rotary drum in a water tank containing washing water, the lower circular part of the first end of the rotary drum being immersed in the washing water so as to form a lower water infiltration zone;
providing a non-water infiltration zone continuous with the lower water infiltration zone on a second end side of the rotary drum;
injecting a paper stock in the lower water infiltration zone of the rotary drum, wherein a refined paper stock of the injected paper stock is passed into the water tank through air and water passage apertures formed in a wall which forms the rotary drum, and wherein, in the lower water infiltration zone, foreign matter, which has not passed through the air and water passage apertures in the lower water infiltration zone, is discharged into the non-water infiltration zone;
providing an inclination drum part on the first end side of the rotary drum, the inclination drum part having a diameter that is gradually reduced toward the second end side of the rotary drum, wherein the inclination drum part is provided with a lower upward inclination surface that is arranged so as to guide the foreign matter toward the non-water infiltration zone;
providing a plurality of annular weir plates at an inner surface of the rotary drum so as to be axially spaced from one another such that the lower water infiltration zone is partitioned into a plurality of zones by the weir plates, wherein one of the annular weir plates is disposed at approximately an interface between the lower water infiltration zone and the non-water infiltration zone;
providing a plurality of raking fins between adjacent ones of the annular weir plates, the raking fins being arranged so as to guide the foreign matter toward the non-water infiltration zone by allowing the foreign matter to pass over the weir plate disposed at approximately the interface between the lower water infiltration zone and the non-water infiltration zone; and
providing a plurality of guide fins at an inner surface of the second end side of the rotary drum, the guide fins being arranged so as to guide the foreign matter toward a discharge port.

4. A method according to claim 3, further comprising:
providing a shower at an inner or outer side of the rotary drum for flowing down the paper stock into the lower water infiltration zone from the wall forming the rotary drum,
wherein the paper stock, which has flowed down into the lower water infiltration zone, is passed into the water tank through the air and water passage apertures formed in the wall forming the rotary drum.

* * * * *